(12) United States Patent
Murphey (10) Patent No.: US 9,115,948 B2
(45) Date of Patent: Aug. 25, 2015

(54) SUPPORT APPARATUS

(71) Applicant: Lyle Murphey, Austin, TX (US)

(72) Inventor: Lyle Murphey, Austin, TX (US)

(73) Assignee: Gunrest Enterprise, Inc., Spicewood, TX (US)

( * ) Notice: Subject to any disclaimer, the term of this patent is extended or adjusted under 35 U.S.C. 154(b) by 0 days.

(21) Appl. No.: 13/716,182

(22) Filed: Dec. 16, 2012

(65) Prior Publication Data
US 2014/0165445 A1    Jun. 19, 2014

(51) Int. Cl.
| | |
|---|---|
| *F41A 23/18* | (2006.01) |
| *A47B 81/00* | (2006.01) |
| *F41C 33/00* | (2006.01) |
| *B60R 7/14* | (2006.01) |
| *B60R 11/00* | (2006.01) |

(52) U.S. Cl.
CPC .............. *F41A 23/18* (2013.01); *A47B 81/005* (2013.01); *B60R 7/14* (2013.01); *F41C 33/007* (2013.01); *B60R 2011/004* (2013.01)

(58) Field of Classification Search
CPC ... A47B 81/005; F41C 33/006; F41C 33/007; F41C 33/008; F41C 33/06; F41A 23/18; B60R 7/14; B60R 2011/004
USPC .......................................... 42/70.11; 206/317
See application file for complete search history.

(56) References Cited

U.S. PATENT DOCUMENTS

| | | | | |
|---|---|---|---|---|
| 2,783,896 | A * | 3/1957 | Agostini et al. ................. | 211/64 |
| 3,477,586 | A * | 11/1969 | Haluska .......................... | 211/64 |
| 4,450,989 | A * | 5/1984 | Bogar, Jr. ....................... | 224/549 |
| 5,022,536 | A * | 6/1991 | Pierson .......................... | 211/64 |
| 5,454,931 | A * | 10/1995 | Lauve, Jr. ...................... | 206/317 |
| 8,403,278 | B1 * | 3/2013 | Kasbohm ................... | 248/206.5 |

FOREIGN PATENT DOCUMENTS

GB            1040333       *   8/1966

* cited by examiner

Primary Examiner — Stephen M Johnson
(74) Attorney, Agent, or Firm — Jason W. Deats (57) ABSTRACT

A support apparatus includes a main element supported by lanyard. The main element includes one or more channels for supporting an object such as a firearm in a substantially vertical position. The support apparatus may include a hook or other fastener for removably coupling to a vehicle or other fixed object. In some embodiments, channel dividers are semi-spherical in shape, and may be generally semispherical with a teardrop (i.e., drooping) shape. The channel dividers may be sacks or vessels filled with an elastic type substance (e.g., silicon) and be firmed to elastically grip the firearm and provide a firm support.

4 Claims, 12 Drawing Sheets

SUPPORT APPARATUS

TECHNICAL FIELD

The present disclosure relates to firearm accessories.

BACKGROUND ART if a hunter is preparing for a hunt while unloading a vehicle, the hunter may lean a firearm (e.g., long rifle) against a vehicle. A vehicle surface is an undesirable surface to lean the firearm because the firearm is often subject to sliding across the surface and may fall. If leaned against a painted surface, the firearm may scratch the vehicle.

SUMMARY

Embodied systems are support apparatuses for placing between a firearm or other implement and a fixed surface such as a vehicle panel. An embodied apparatus has a lanyard with the top end, a middle portion, a bottom end, and an end portion which is between the middle portion and the bottom end. The support apparatus further includes a channel, and a fastener coupled to the top end of the lanyard. A connector is coupled to the bottom end of the lanyard and is removably coupled to the middle portion of the lanyard. The support apparatus further comprises a main element with a lanyard chamber for receiving the end portion of the lanyard.

In some embodiments, the channel has a concave face. The support apparatus may have further channels, and also include channel dividers between the channels. The support apparatus may include in some embodiments a fastener for removably coupling the support apparatus or a portion of the support apparatus (e.g., the main element) to a firearm. In some embodiments, the main element includes a fastener (e.g., hook and loop fasteners, magnets) for removably coupling the main element to a vehicle. The main element may be substantially square or rectangular in cross-section, or may have a generally circular or round cross-section, in some embodiments, when the main element has a substantially round or circular cross-section, the main element may further comprise a flattened rear surface for contact with a vehicle, for example.

Another embodiment is a firearm support that includes a main element, a first channel divider, a second channel divider, and an interface for coupling the main element to a vehicle. The first channel divider is generally bulbous shaped, which may in some embodiments be a semi-sphere or a generally spherical teardrop shape. The first channel divider and the second channel divider may have raised portions. The raised portions may be, for example, generally tubular in shape. in some embodiments, the main element of the firearm support includes a lanyard with a top end, a middle portion, a bottom end, and an end portion, A fastener is coupled to the top end, and a connector is coupled to the bottom end. The connector is removably coupled to the middle portion, and the lanyard chamber of the main element receives the end portion of the lanyard, In some embodiments, the firearm support has a magnet coupled to or within the interface. The magnet in some embodiments is positioned to magnetically interface to the firearm if a portion of the firearm is positioned within the channel. The fastener coupled to the top end of the lanyard may include a plurality of holes. A first hole receives a portion of the end portion of the lanyard, thereby forming the bottom end of the lanyard. in this embodiment, the lanyard's end may be tied off in a knot through the first hole to form the bottom end of the lanyard.

In some embodiments, second and third holes within the fastener permit the fastener to be slidably connected to the middle portion of the lanyard. A force can cause the middle portion of the lanyard to slide to the second hole of the third hole, particularly if the lanyard is not in tension or is not otherwise supporting the weight of the main element. In this way, the lanyard can hold its effective length when in operation, but may be shortened or lengthened as needed between uses (by sliding a portion of the lanyard through the second hole and third hole to adjust the overall effective length of the lanyard).

DESCRIPTION OF EMBODIMENTS

Embodiments of the claim subject matter may function as a support apparatus or firearm support. In some embodiments, the apparatus is coupled to a vehicle, such as the luggage rack on top of a sport utility vehicle. The device may be coupled to the luggage rack by a fastener such as a metallic or plastic hook, for example.

Figure 1:
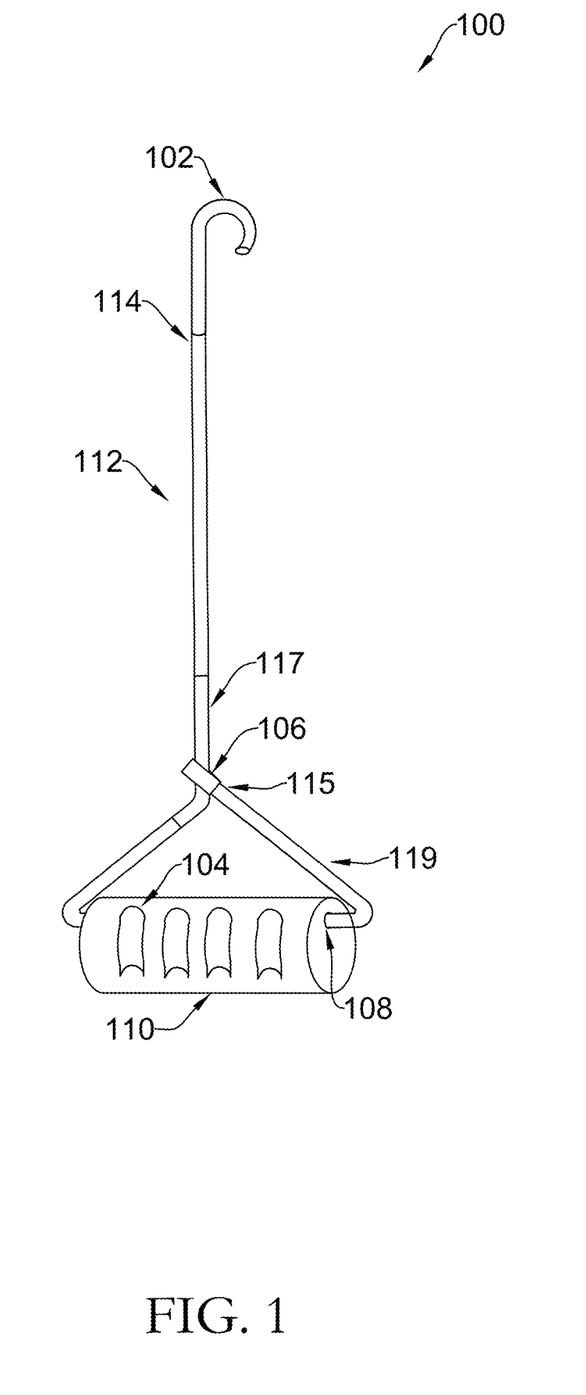
FIG. 1 depicts an assembled view of an embodied support apparatus or firearm. support.
Figure 4:
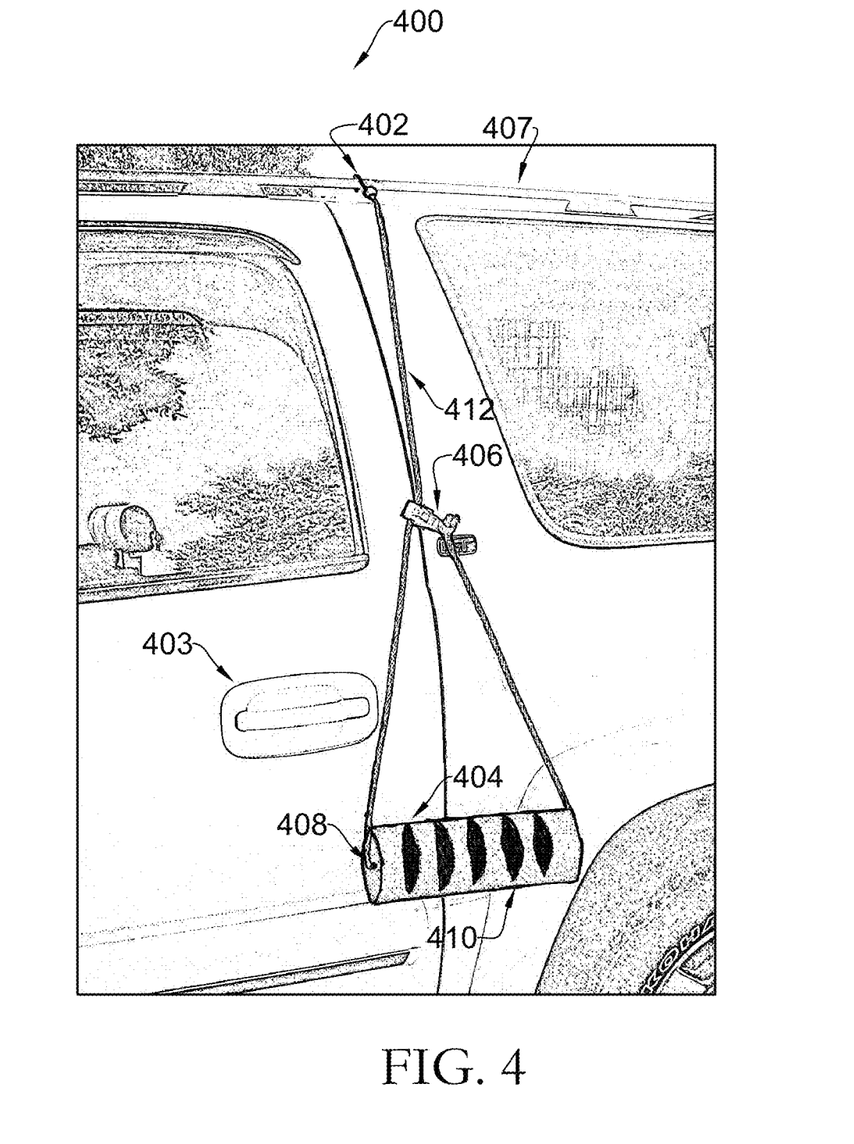
FIG. 4 illustrates a support apparatus coupled to a vehicle for use in supporting firearms.

Referring to FIG. 1, an assembled view is shown of an exemplary support apparatus 100. Support apparatus 100 may be used as a firearm support or gun rest. As shown, support apparatus 100 includes channel 104, which provides an indentation or cavity into which a firearm (or similar device) can be partially placed. Generally, the indentation or cavity provided by channel 104 wraps around and supports the firearm, and prevents the firearm from falling over. As will be discussed later, and as shown in FIG. 4, support apparatus 100 may be installed on a vehicle such as a sport utility vehicle.

If the support apparatus 100 in FIG. 1 is installed on a vehicle such as a sport utility vehicle, it will provide a place for a firearm or similar device to be rested while in a generally vertical position. Fastener 102 is a hook as shown in FIG. 1; however, embodied systems may use fasteners other than hooks for coupling the device to a vehicle or other fixed object. As shown, fastener 102 is coupled to top end 114 of lanyard 112. By way of examples, fastener 102 may be coupled to the top end 114 of lanyard 112 using adhesive, or by tying a portion of top end 114 of lanyard 112 through a loop portion of fastener 102 (not depicted). Fastener 102, lanyard 112, and associated components provide an interface for coupling the support apparatus to a vehicle or other fixed object (e.g., wall, pole, fence).

Main element 110 includes channel 104, and as depicted may include several other channels for holding or supporting multiple devices (e.g., multiple rifles). Main element 110 includes a lanyard chamber 108, which in the embodiment illustrated in FIG. 1, is a tunnel or chamber through which a portion of lanyard 112 may be fed. As shown, a middle portion 117 of lanyard 112 is contacted by connector 106. Connector 106, for example, is a spring loaded clamp that is removably and adjustably fastened to the middle portion 117. As shown, bottom end 115 of lanyard 112 is coupled to connector 106. An end portion 119 of lanyard 112 is fed through lanyard chamber 108. As shown, the end portion 119 of lanyard 112 is between the bottom end 115 and the middle portion 117 of lanyard 112.

Figure 2A:
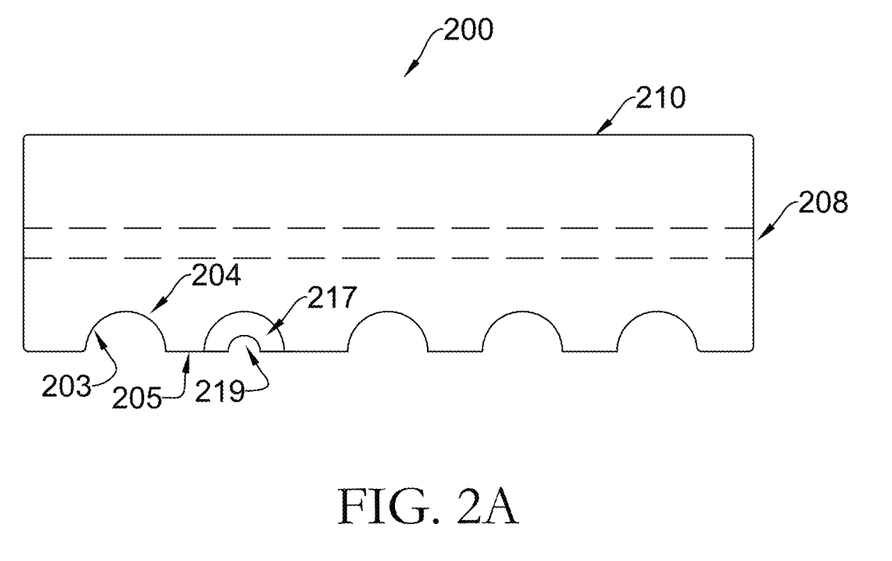
FIG. 2A depicts a top view of the main component (i.e. main element) of the support apparatus of FIG. 1.

FIG. 213 depicts a top view 200 of portion of a support apparatus such as the one depicted in FIG. 1. As shown, top view 200 is of main element 210, which may be identical to or similar to main element 110 from FIG. 1. Main element 210 as shown includes a lanyard chamber 208 which is configured to slidably house a portion of the lanyard used for hanging, for example, the support apparatus. In some embodiments, lanyard chamber 208 is cylindrical and hollow in shape, and is barely bigger in diameter than a lanyard (e.g., lanyard 112 of FIG. 1), As shown in FIG. 2A, main element 210 includes channel 204 which is formed in part by concave face 203. Concave face 203 may be shaped and sized to accommodate for example, a 12 gauge shotgun barrel. In contrast, concave face 203 may be shaped and sized to accommodate a smaller diameter of barrel, such as a rifle. Channel 204 is separated by channel 219 by channel divider 205. In some embodiments, concave face 203, or one like it, may receive removable inserts such as the one depicted by removable inserts 217. As shown, removal insert 217 forms channel 219, which is shown being of smaller size than channel 204. Removable insert 217 may be received by channel 204 or a similar channel using magnets, adhesive, hook and loop, or other methods and modes of fastening the objects together.

Figure 2B:
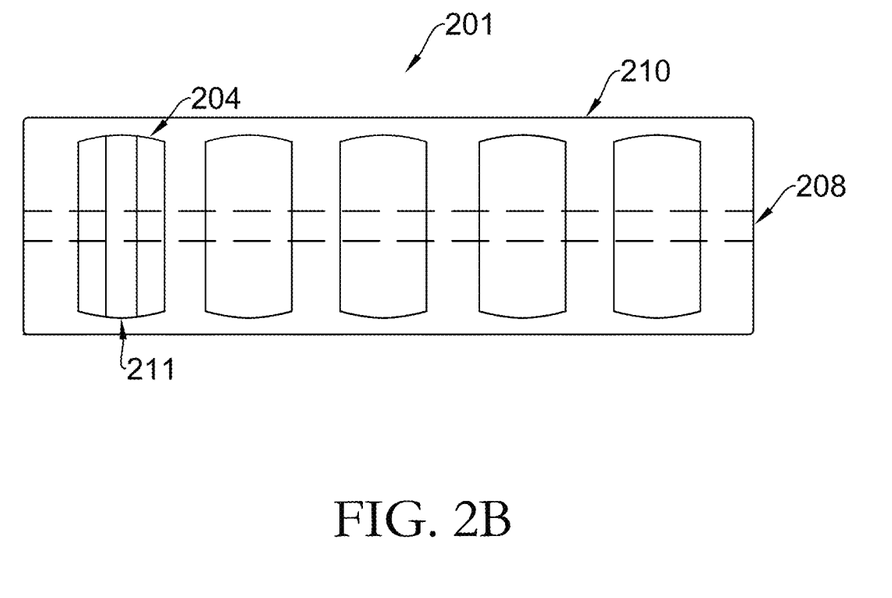
FIG. 2B depicts a front view of the main component of the support apparatus of FIG. 1.

FIG. 2B illustrates a front view 201 of main element 210. Main element 210 as depicted in front view 201 is the same or similar to the main component 210 as depicted in FIG. 2A. Main element 210 as depicted in front view 201 also includes fastening magnet 211, which may be used to keep a firearm, for example, nestled within channel 204 during use of the support apparatus. Main element 210 depicts lanyard chamber 208 as two dashed lines. A dashed line in FIG. 2B, FIG. 2A, and other figures (as dashed lines are used in other drawings such as architectural drawings) depicts a hidden line, to illustrate that in a particular view an element is behind or inside that which is visible.

Figure 3A:
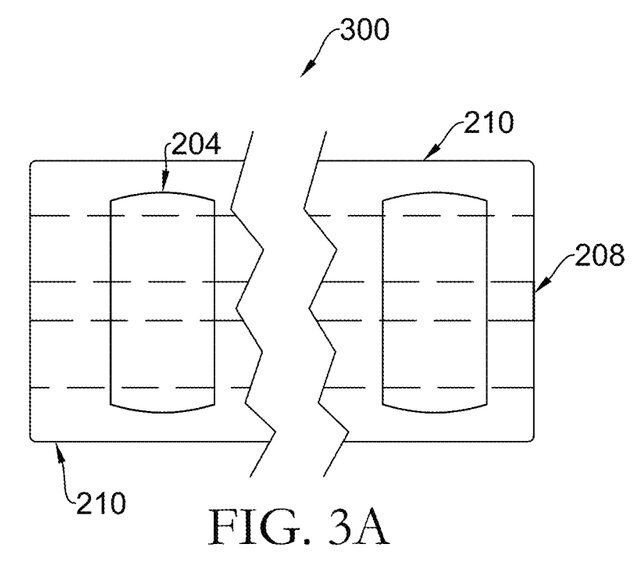
FIG. 3A depicts a portion (with a middle portion cut away for clarity and to fit on the page) of the front view of the main component of the support apparatus of FIG. 1, and is aligned with the end view shown in FIG. 3B of the main component of support apparatus of FIG. 1.

To further illustrate and describe the main element of a support apparatus (similar or identical to main element 210 of FIG. 2A and FIG. 2B), FIG. 3A depicts front view 300, which shows a portion of main element 210, and which is a cutaway view to fit on the page. As shown, main element 210 includes channel 204 and lanyard chamber 208.

Figure 3B:
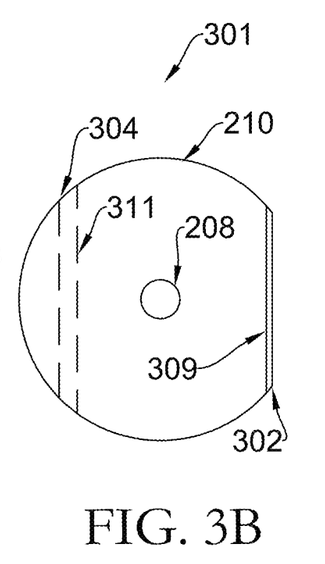
FIG. 3B depicts an end view of the main component of the support apparatus of FIG. 1.

An end view 301 of main element 210 is depicted in FIG. 3B. As shown, main element 210 and FIG. 3B includes lanyard chamber 208 (which is shown as a circle and goes into the page). Hidden line 304 shows a relative depth of channel 204 of FIG. 3A. Rear surface 302 is provided, in the depicted embodiment, but magnet 309, which may be used to further secure the support apparatus to a metallic surface such as a vehicle body panel, tow bar, bumper, cattle guard, fence post, or other metallic object. Magnet 311 provides additional support to ensure a rifle (with a metal barrel) is well supported and secure within channel 304. Magnets 311 and 309 may be coated or embedded within main element 210 to prevent scratching or otherwise damaging a firearm or vehicle when the support apparatus is in use.

FIG. 4 depicts an embodied support apparatus 400 installed on a vehicle for holding in a vertical position a firearm (or, as shown in FIG. 4, holding up to five firearms, since there are five channels). For context, door handle 403 (which is not a part of the support apparatus), is on a sport utility vehicle, a portion of which is shown in FIG. 4. FIG. also depicts on the sport utility vehicle a first and second side window. As shown, channel 404 is in a substantially vertical position. Channel 404 may be identical to or similar to channel 104 from FIG. 1 and similar channels. The support apparatus includes fastener 402, which is a hook that is hooked to a luggage rack 407. Lanyard 412 is coupled to fastener 402. As shown, a portion of lanyard 412 is fed through a lanyard chamber 408 in main element 410. Connector 406 is coupled to a bottom end portion of lanyard 412. Connector 406 is also coupled to a middle portion of lanyard 412, to form a triangle shaped configuration that supports main element 410. As shown, connector 406 is removably coupled to the middle portion of the lanyard to adjust the height of main element 410 up and down the side of the vehicle, to properly contacted support rifles and other firearms that are: (1) resting on the ground; and (2) held in a vertical position by the support apparatus.

Embodied support apparatuses (e.g., gun rests, firearm supports) include connectors for attaching a portion of the support lanyard (e.g., support lanyard 112 in FIG. 1) to itself, to effectively create a loop, for supporting the main element (e.g., main element 110 of FIG. 1). Having a portion of the lanyard as a loop provides enhanced ability for the main element, because it is supported on two ends (i.e., on each end). Further, the effective length of the apparatus can be adjusted to properly contact the firearm or supported device.

Figure 5A:
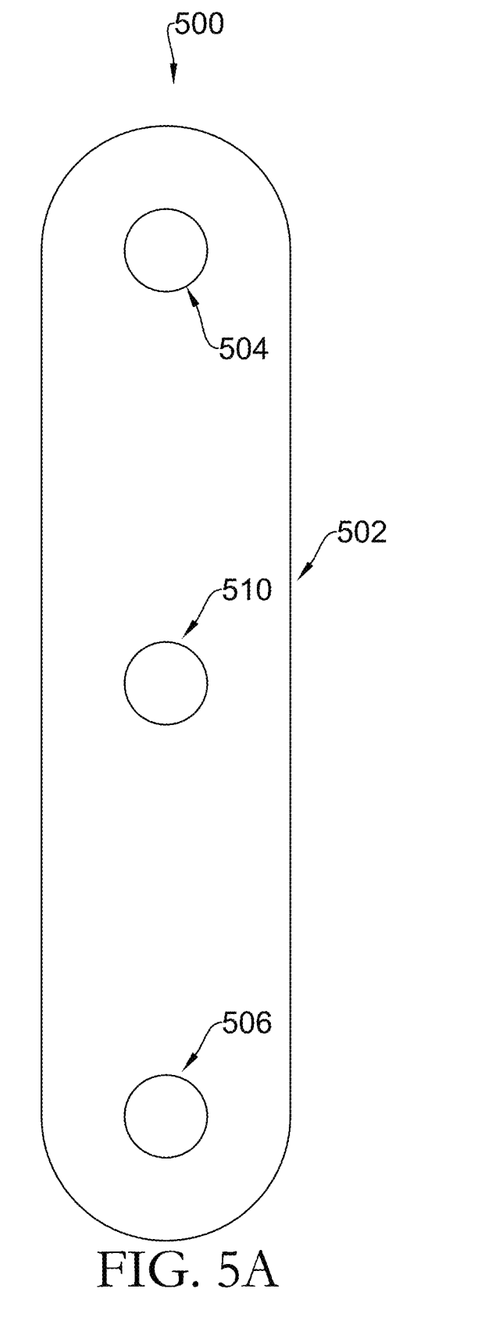
FIG. 5A illustrates a front view of a connector which may be coupled to the bottom end of a lanyard and the middle portion of the lanyard for supporting the main element.
Figure 5B:
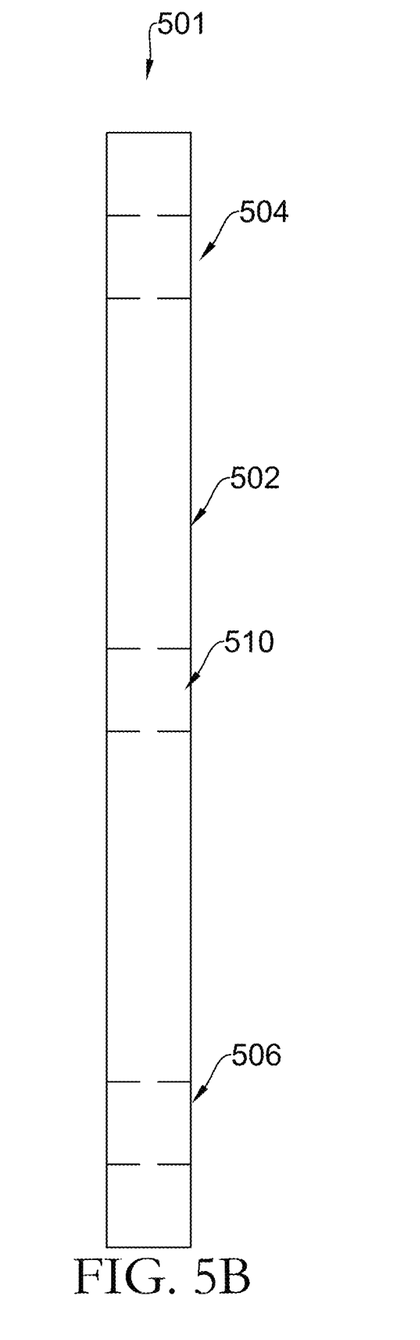
FIG. 5B illustrates the side view of the connector from FIG. 5A.

FIG. 5A depicts a front view 500 of connector 502. As shown, connector 502 includes a first hole 504, a second hole 510, and a third hole 506. FIG. 5B depicts side view 501 of the same connector 502 as shown in FIG. 5A, which includes side views of hole 504, hole 510, and hole 506.

Figure 6:
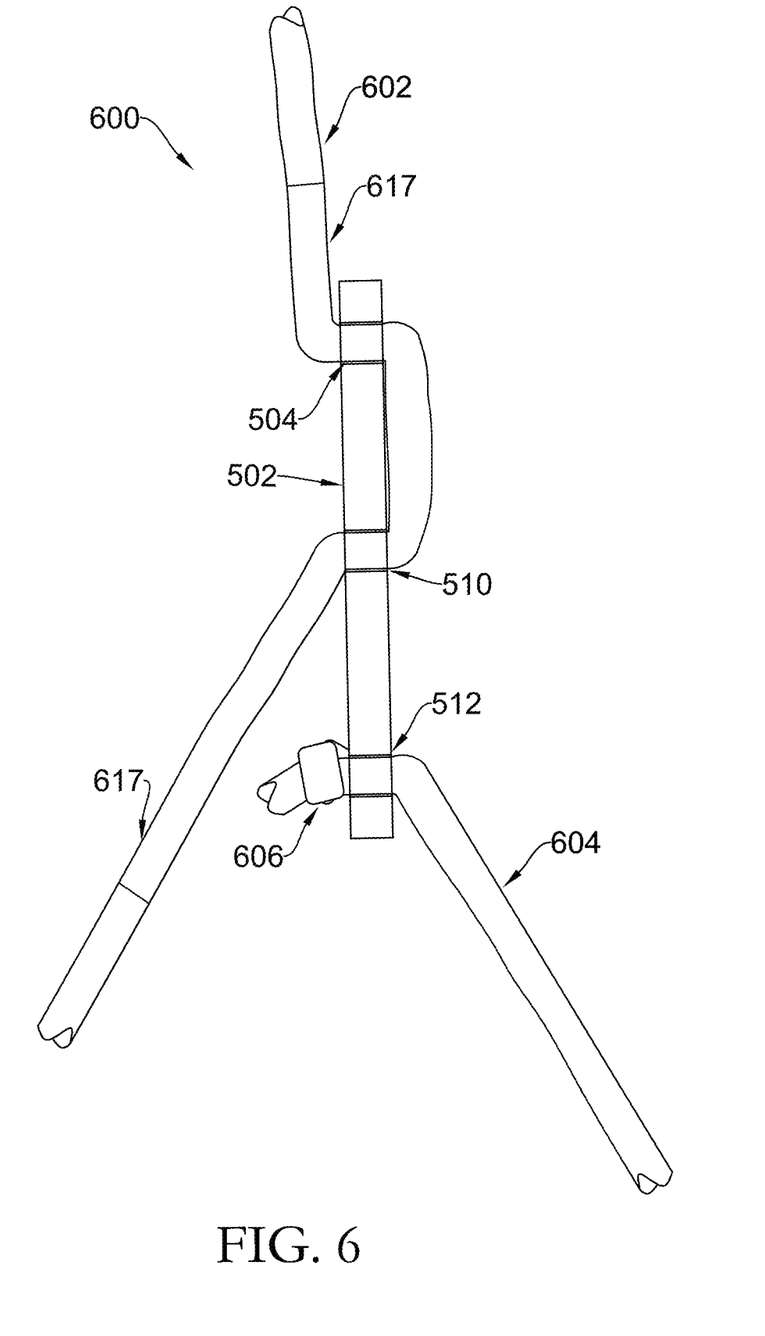
FIG. 6 illustrates the connector from FIG. 5A, coupled to the bottom end of a lanyard and the middle portion of the lanyard.

FIG. 6 depicts a side view 600 of connector 502 from FIGS. 5A and 59. As shown, connector 502 has a piece of end portion 604 from a lanyard 602 (e.g., which may be similar or identical to lanyard 112 from FIG. 1). Middle portion 617 of lanyard 602 goes through middle hole 510 in connector 502. A further portion of middle portion 617 of lanyard 602 goes through top hole 504. In this arrangement, a firearm support or support apparatus is slidably connected to the middle portion 617 of lanyard 602. Due to friction between the connector's two top holes (holes 504 and 510) and lanyard 602, connector 502 remains in place along lanyard 602 when in use. To adjust (e.g., shorten) the effective length of a support apparatus (by making more of the lanyard doubled up at the bottom), the main element (not depicted) can be lifted, and a pulling force applied to the portion of the lanyard between top hole 504 and middle hole 510 can cause the middle portion 617 of the lanyard to slide through the first hole and the second hole. To shorten the effective length of the support apparatus, a portion of lanyard 602 would be moved down through the holes, effectively raising connector 502 from the ground if installed on a vehicle. Due to the friction between lanyard 602 and connector 502, and how the level of friction is affected by whether connector 502 is in line with or perpendicular to a portion of the lanyard being fed through the connector, an amount of the force required to pull lanyard through the holes in connector 502 is greater if the main element (not depicted) hangs from lanyard 602 during operation causing the lanyard to be taut (and relatively with, as opposed to perpendicular to, connector 502.

As shown in FIG. 6, connector 502 has a plurality of holes, and the top two holes receive a portion of the middle portion 617 of lanyard 602. In addition, the bottom hole 512 of connector 502 receives the end of end portion 604 of lanyard 602. End portion 604 is tied into knot 606 on the other side of bottom hole 512.

Figure 7A:
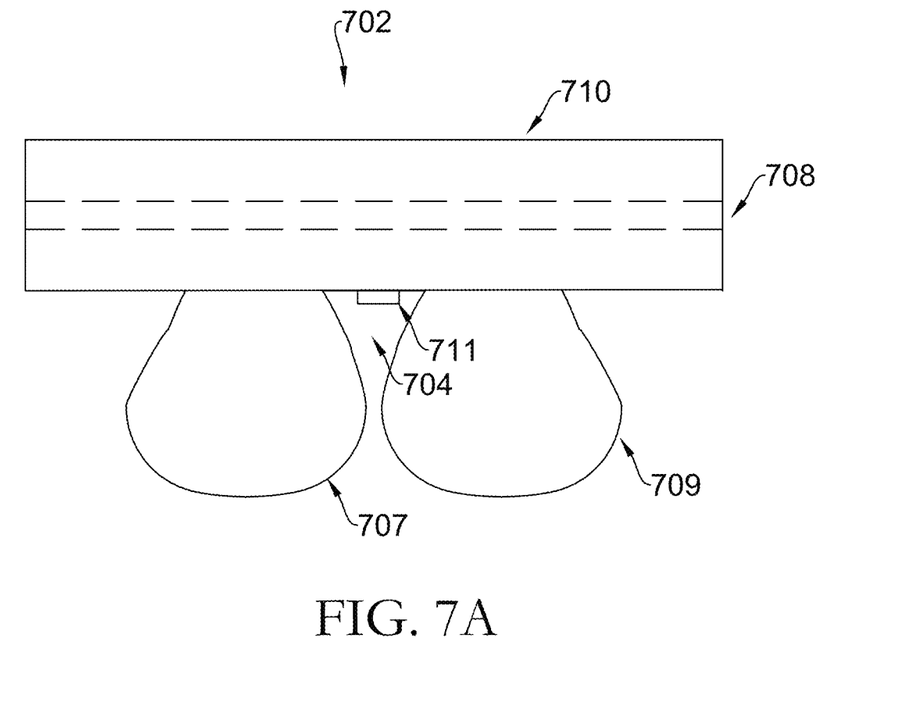
FIG. 7A illustrates the top view of the main element of the support apparatus, where the channel dividers are bulbous shaped, and generally shaped in a semi-spherical tear drop.
Figure 7B:
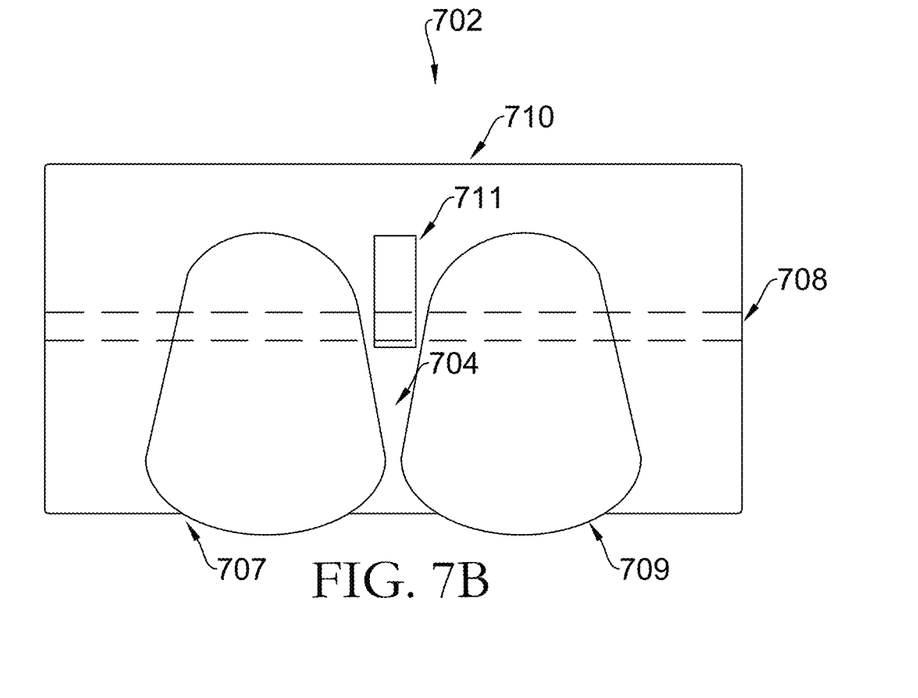
FIG. 7B illustrates the front view of the main element of the. support apparatus of FIG. 7A.

FIG. 7A depicts a top view 702 of main element 710 of an embodied support apparatus or gun rest. As shown, main element 710 includes a lanyard chamber 708. As shown, lanyard chamber 708 is hollow and tubular for allowing a lanyard such as a rope to pass through and support main element 710. As shown, channel divider 707 is bulbous in shape, as is channel divider 709. Magnet 711 provides a force which is attracted to metallic objects such as a gun barrel for securing a firearm within channel 704 during use, FIG. 7B is a front view 702 of main element 710, which is identical to or similar to main element 710 in FIG. 7A. As shown, channel divider 707 and channel divider 709 are bulbous in shape, and also generally have the shape of a semi-spherical teardrop. It is not imperative that the shape of channel divider 707 and the shape of channel divider 709 are exactly the same. Indeed as shown in FIG. 7A, channel divider 709 has a slightly different shape compared to channel divider 707.

Figure 7C:
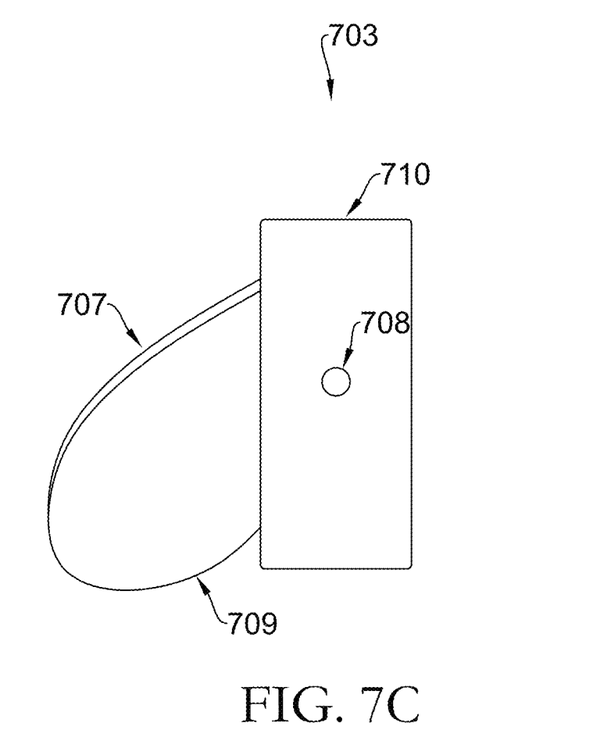
FIG. 7C illustrates an end view of the main element and channel dividers of FIG. 7A and FIG. 7B.
Figure 8A:
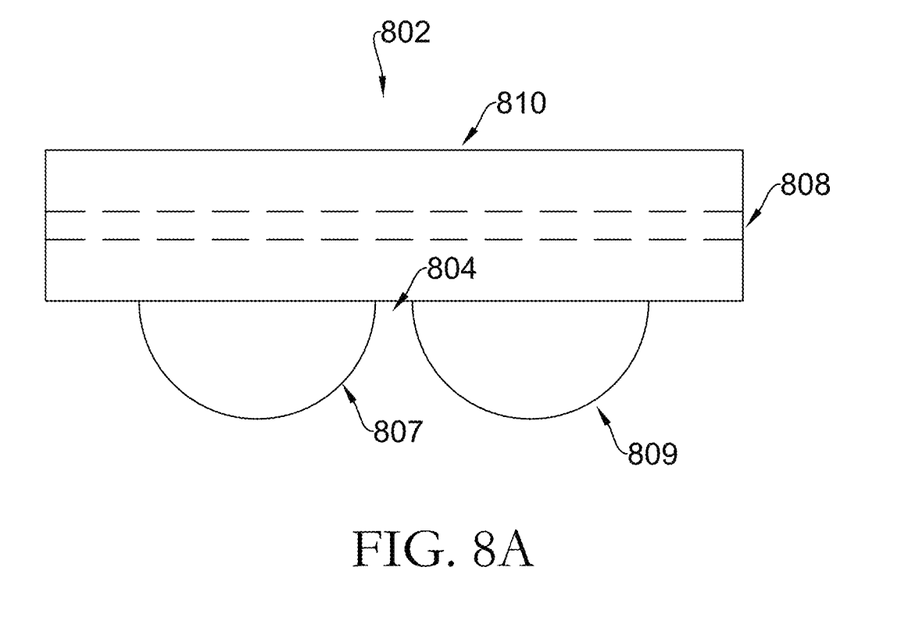
FIG. 8A illustrates the top view of a main element of a support apparatus, where the channel dividers are generally semispherical in shape.

FIG. 7C depicts side view 703 of main element 710 depicted in FIG. 7A and HG. 7B. As shown, main element 710 includes lanyard chamber 708, which is round and goes into the page to receive a lanyard made of rope or similar material. Channel divider 707, as shown, is of slightly different shape than channel divider 709. As shown, channel divider 709 and channel divider 707 are bulbous and semi-spherical teardrop shapes. Ideally, channel divider 707 and channel divider 709 are made of or filled with a material that permits a flexible and elastic interface with a firearm placed within channel 704 (FIG. 7A and FIG. 7B). For example, the firearm could be squeezed within channel divider 707 and channel divider 709, and once it was there, channel 704 would provide a secure support, to prevent lateral movement, and ensure the firearm stayed in a substantially vertical position while engaged with the holding apparatus, FIG. 8A depicts a top view 802 of main element 810, which may be similarly supported by a lanyard as the main element 110 from FIG. 1. Lanyard chamber 808 goes through the entire length of main element 810 and is represented by hidden lines (i.e., dashed lines) to represent its placement within (i.e., inside) main element 810. As shown, channel divider 807 and channel divider 809 are generally semi-spherical in shape and provide a channel 804 into which a firearm may be placed for vertical support.

Figure 8B:
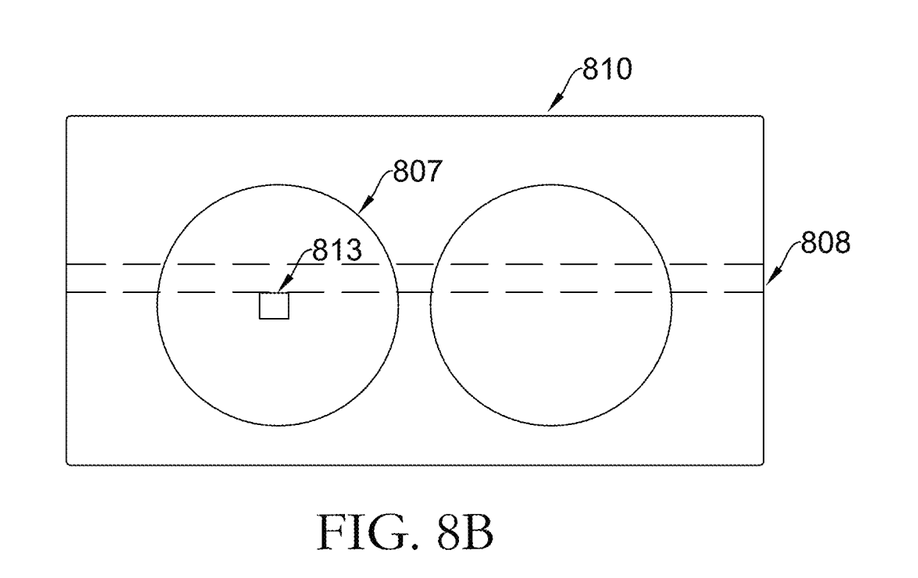
FIG. 8B illustrates the front view of the main element of the support apparatus of FIG. 8A.

FIG. 8B provides further details regarding the general shape of the main element 810 and channel dividers 807 and 809 from FIG. 8A. As shown, channel dividers 807 and 809 are semi-spherical. Each also include optional raised portions 813 and 815, respectively. First raised portion 813 is square in shape and protrudes from channel divider 807. In the event a support apparatus with main element 810 is used during the night or when there is a lack of sufficient light, the middle of channel divider 807 can be easily found by raised portion 813. Likewise, raised portion 815 provides a reference regarding a center point (or near center point) of channel divider 809.

As shown, lanyard chamber 808 is within main element 810 (since it is represented by hidden or dashed lines). In some embodiments, channel dividers 807 and 809. are preferably made of soft material to prevent scratching a firearm. Also, the dividers are preferably made of a material firm enough to adequately support the firearm in a vertical position, but pliable enough to permit easily placing the firearm within channel 804. Silicon bags and a combination of elastic materials (e.g., rubber, plastics), may be used to achieve the correct configuration for whatever (e.g., fishing rod, firearm, etc.) is anticipated to be supported by the apparatus. Likewise, the distance between channel divider 807 and channel divider 809, and the effective width of channel 804, can be adjusted so that the nominal width at rest, and consequently the amount of "squeeze" provided by the dividers, and also the resistance to putting object between the dividers, is optimized. In some embodiments, channel dividers are made of a foam like material that also floats in water.

Figure 8C:
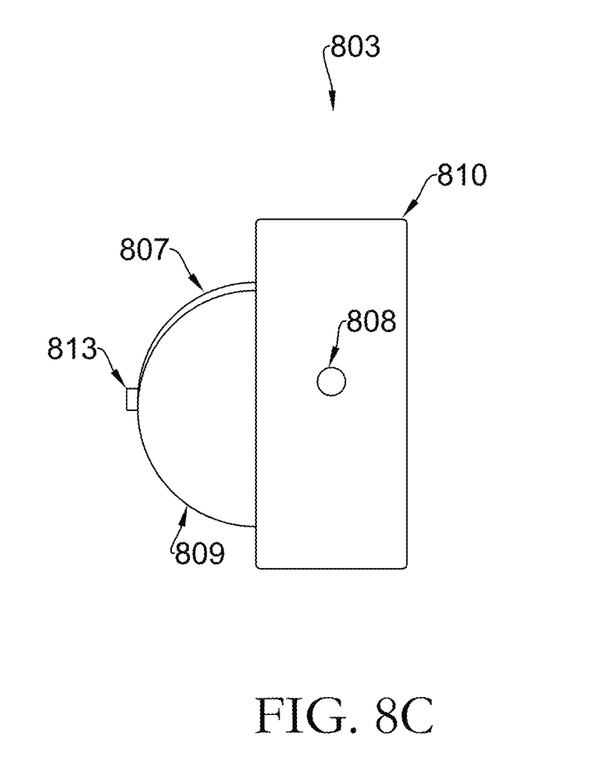
FIG. 8C illustrates a front view of the main element of the support apparatus of FIG. 8A.

FIG. 8C depicts end view 803 of main element 810 which includes, like other main elements (e.g., main element 110 of FIG. 1) a lanyard chamber 808. As shown, the shapes of channel divider 807 and 809 are similar, but not necessarily identical. Channel divider 807 and channel divider 809 are generally semi-spherical in shape and protrude from main element 810.

Figure 9:
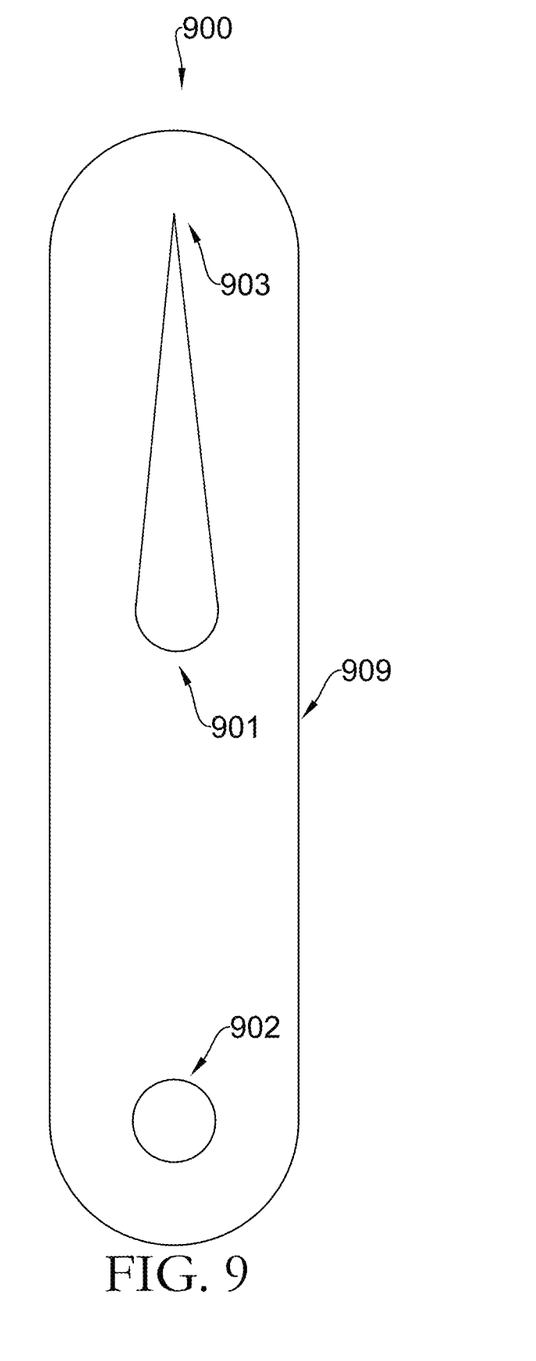
FIG. 9 illustrates a front view of a connector similar to the one in FIG. 5A which may be coupled to the bottom end of a lanyard and the middle portion of the lanyard for supporting the main element.
Figure 10:
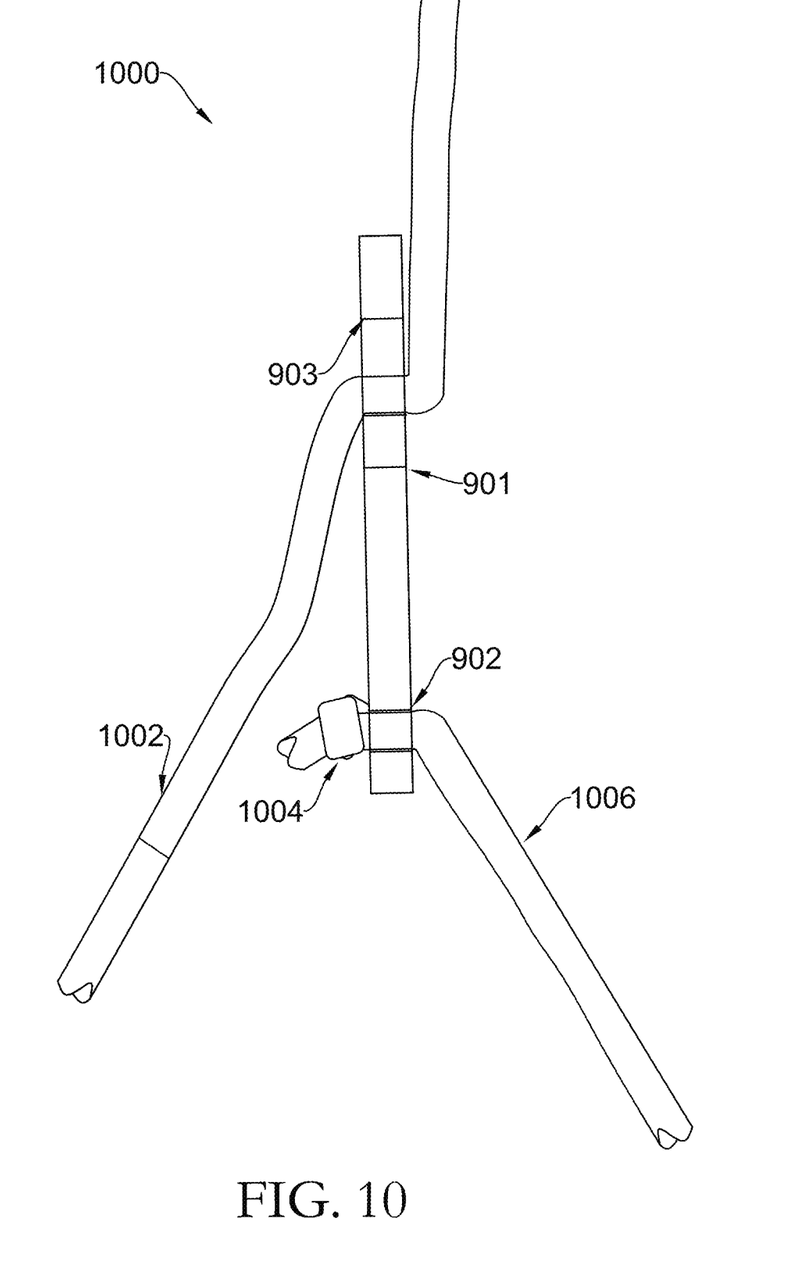
FIG. 10 illustrates the side view of the connector from FIG. 9.

FIG. 9 depicts a front view 900 of connector 909. As shown, connector 909 includes a first hole 902 and a second hole 901. As shown, hole 901 is tapered to a point 903. This configuration grips a lanyard as shown in FIG. 10, which depicts side view 1000 of the same connector 909 as shown in FIG. 9. Lanyard 1002 is inserted into connector 909 through hole 901 and is gripped by the connector below point 903. As shown, end portion 1006 of lanyard 1002 is inserted through hole 902 and tied into knot 1004. This achieves a slidable and adjustable connection with lanyard 1002.

Objects that embody the appended claims may be described herein as "exemplary," "exemplary embodiments," or similar terms. Such descriptions are meant to indicate examples of claimed subject matter. The descriptions are not meant to suggest, by use of the term "exemplary," that one embodiment is better than another embodiment.

What is claimed:

1. A firearm support comprising:
a main element;
   a first channel divider, wherein the first channel divider is generally bulbous shaped;
   a second channel divider, wherein the second channel divider is generally bulbous shaped, wherein the first channel divider and second channel divider form a channel for contacting a firearm barrel; and
an interface configured for hanging the main element from a vehicle, wherein the interface comprises a lanyard chamber, wherein the interface comprises:
   a lanyard configured to hang the main element from a vehicle, the lanyard comprising:
     a top end;
     a middle portion;
     a bottom end; and
     an end portion;
     a fastener coupled to the top end; and
     a connector coupled to the bottom end, wherein the connector is removably coupled to the middle portion, wherein the lanyard chamber is for receiving the end portion.

2. The firearm support of claim 1, wherein the connector comprises:
   a plurality of holes, wherein a first hole of the plurality of holes receives a portion of the end portion, thereby forming the bottom end.

3. The firearm support of claim 2, wherein a second hole and third hole of the plurality of holes receives a portion of the middle portion.

4. The firearm support of claim 3, wherein the second hole and third hole of the plurality of holes are slidably connected to the middle portion, wherein a force can cause the middle portion to slide through the first hole and the second hole, wherein an amount of the force required is more if the main element hangs from the lanyard causing the lanyard to be taut.

* * * * *